E. R. SCOTT.
INSECT EXTERMINATOR.
APPLICATION FILED OCT. 9, 1911.

1,054,870.

Patented Mar. 4, 1913.

2 SHEETS—SHEET 1.

Witnesses
C. W. Riffey
Grace C. Irwin

Inventor
Earl Robert Scott
By Eugene D. W. Begory
Attorney

E. R. SCOTT.
INSECT EXTERMINATOR.
APPLICATION FILED OCT. 9, 1911.

1,054,870.

Patented Mar. 4, 1913.
2 SHEETS—SHEET 2.

Witnesses
Grace C. Irvine

Inventor
Earl Robert Scott
By Eugene D. Bogory
Attorney

UNITED STATES PATENT OFFICE.

EARL ROBERT SCOTT, OF LUEDERS, TEXAS.

INSECT-EXTERMINATOR.

1,054,870.   Specification of Letters Patent.   Patented Mar. 4, 1913.

Application filed October 9, 1911. Serial No. 653,754.

*To all whom it may concern:*

Be it known that I, EARL ROBERT SCOTT, a citizen of the United States, residing at Lueders, in the county of Jones and State of Texas, have invented certain new and useful Improvements in Insect-Exterminators, of which the following is a specification.

This invention relates to insect exterminators and more particularly to that class of machines adapted to brush boll weevils from cotton plants into a furrow where they are crushed automatically, and has for its object to provide an attachment which can be quickly attached to or removed from a cultivator of usual construction.

The invention consists broadly in providing laterally and vertically adjustable brushes for removing the insects from the plants, whereby the brushes may be readily adjusted to suit plants of different heights or rows of varying distances apart.

Figure 1:
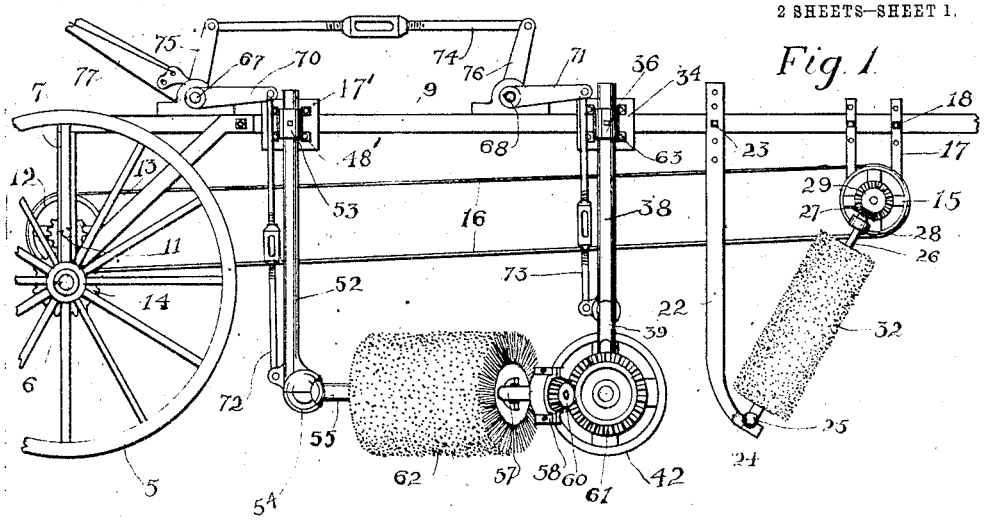
Figure 2:
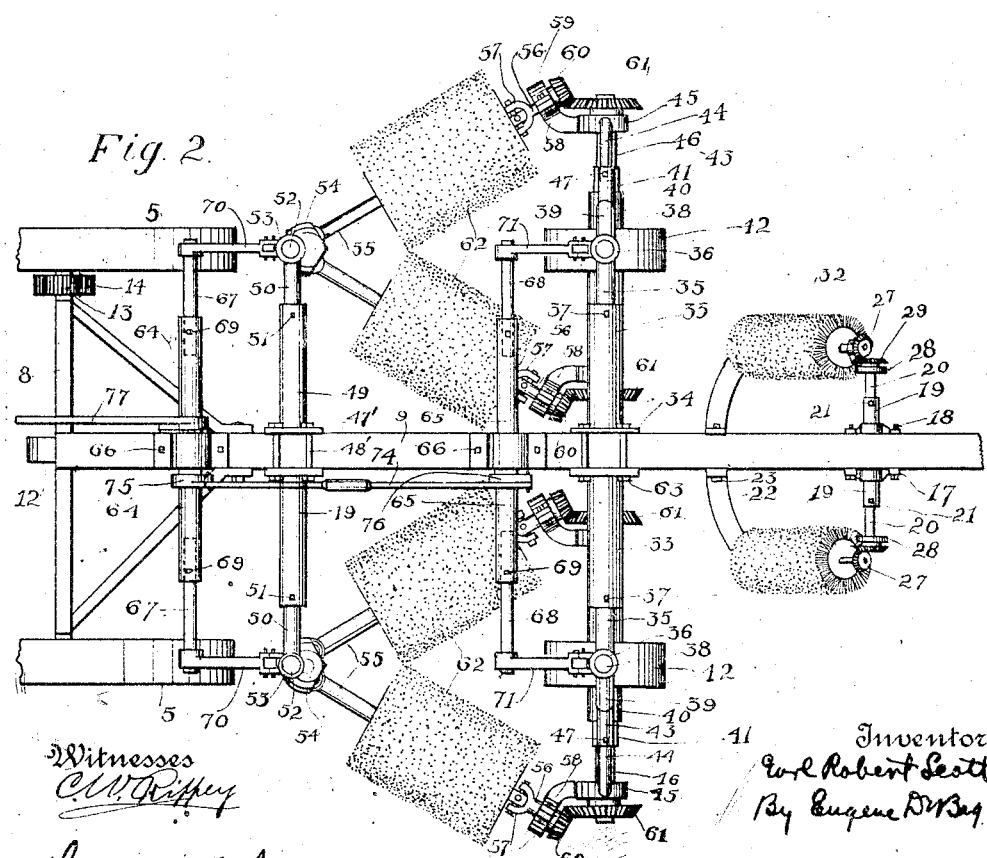
Figure 3:
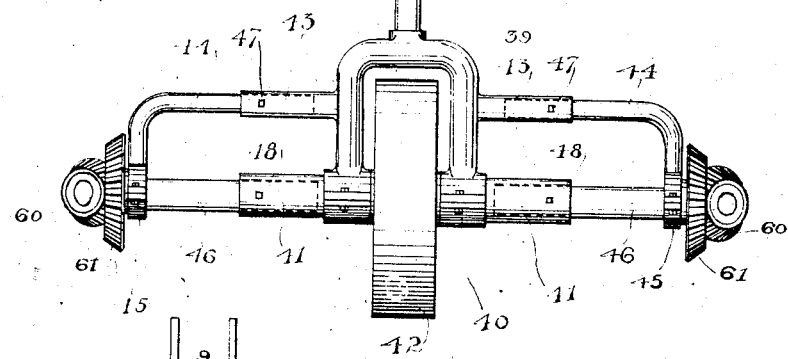
Figure 1:
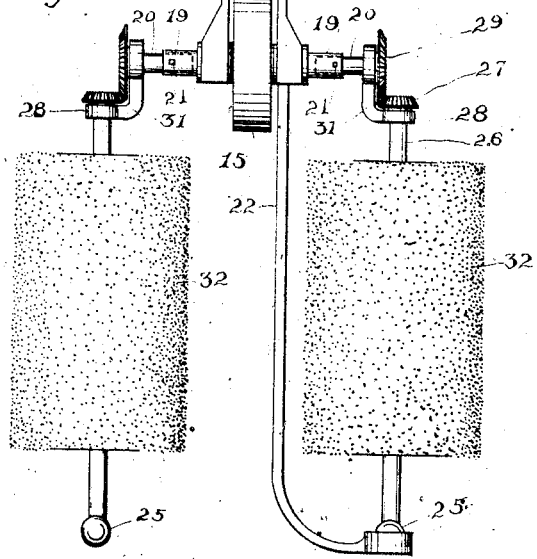

In the drawings: Figure 1 is a side view of my invention attached to a cultivator of any well known construction. Fig. 2 is a plan view. Fig. 3 is a fragmentary front view of the frame supporting the roller wheels 42. Fig. 4 is a front view of the frame supporting the front brushes 32 one of the arms 22 being removed.

Referring more particularly to the drawings in which like reference numerals refer to corresponding parts throughout the different views 5 designates the rear wheels of a cultivator mounted to rotate with an axle 6. Suitable uprights or posts 7 are supported from the ends of the axle 6, and similar posts (not shown) are supported in any suitable manner at the opposite or front end of the cultivator. Cross bars 8 (only one bar shown) connect the posts of each pair and constitute supports for a central longitudinally extending bar 9 which preferably serves as a tongue for drawing the machine. The rear cross bar 8 is provided with alined openings in which the ends of a shaft 11 are journaled. The shaft 11 has a belt wheel 12 and a small gear 13 fixedly secured thereto the latter being positioned to mesh with a gear 14 on the rear axle 6 and the former connected to a pulley or belt wheel 15 by means of driving belt 16.

A bracket or yoke 17 adjustably secured to the bar 9 by means of set screws 18 forms a bearing for a hollow shaft 19 to which the pulley or belt wheel 15 is fixed and in the ends of which shaft short extensions 20 are telescopically and adjustably inserted. Set screws 21 secure the shaft 19 and extensions 20 in any desired adjusted position.

Adjacent the bracket 17 and slightly to the rear thereof is a pair of depending divergingly curved arms 22 secured at their upper ends to the bar 9 by means of set screws 23 and provided at their lower extremities with recesses 24 adapted to receive and rotatably retain a ball or knob 25 formed on one end of downwardly and outwardly and rearwardly inclined shafts 26 the other ends of which have bevel gears 27 formed thereon and are rotatably supported in brackets 28 attached to extensions 20. This construction permits of the extensions 20 and one end of brushes 32 being forced away from or drawn toward the bar 9 without disengaging gear 27 from gear 29 on the end of extensions 20.

33 represents a hollow arm supported from the bar 9 by means of a yoke 34 slidably mounted for longitudinal movement on said bar. Short extensions 35 terminating at their ends in hollow tubular enlargements 36 are loosely inserted in the ends of the hollow arm 33 and adjustably retained therein by means of set screws 37. A rod 38 adjustably secured within each tubular enlargement 36 carries a yoke 39 the ends of which carry split sleeve bearings 40 in turn forming a journal for the hollow axles or shafts 41 fixedly attached to which are the roller wheels 42. Laterally extending tubular projections 43 are also formed on the yoke 39 adapted to adjustably receive one end of a curved support 44 connected at its opposite ends (by means of split bearings 45) to short tubular projections 46 mounted in the ends of hollow shafts 41. Set screws 47 and 48 permit of the curved supports 44 and the projections 46 being lengthened or shortened as occasion requires and in a manner hereinafter explained.

A yoke 47' similar to the yoke 34 and secured to the bar 9 by means of set screws or bolts 48' supports a tubular sleeve 49 extending on either side of and beneath the bar 9. Short tubular extensions 50 similar to the extensions 35 (previously described) are secured within the ends of the sleeve 49 by means of set screws 51, and rods 52 have their upper ends secured in the tubular enlargements 53 of extensions 50 before mentioned. The lower ends of these rods 52 are provided with sockets 54 adapted to form a ball and socket connection with the rear ends of inclined shafts 55. The shafts 55 of each pair which extend in a rearwardly convergingly direction are connected at their forward ends to extension 56 as by a universal joint 57. Arms 58 connected at one end to the split bearings 45 have split bearings 59 at the other end thereof which support the extension 56 and consequently the shafts 55 in position to retain the small beveled gear 60 on extension 56 in mesh with the large beveled gear 61 on extensions 46. Brushes 62 of any suitable or well known construction are secured to the shafts 55.

In practice the machine is drawn between the rows of cotton plants the forward brushes 32 being driven from the rear axle 6 and the rear brushes from the hollow axle 41 on forward wheels 42. The last mentioned wheels also serve the function of depressing a furrow to receive the insects removed from the plants to the ground by the brushes 32 where they are brushed into a row by the brushes 62. In this connection it will be noted that the apex of the angle formed by the converging brushes 62 is in alinement with the vertical axles of said wheels 42. Consequently the brushes 62 brush the insects to the center of the furrow. As the machine proceeds the row of insects thus brushed into the furrow or depression made by the wheels 42 are crushed by the rear wheels 5 and thus completely destroyed.

The forward brushes 32 can be readily raised or lowered to suit plants of different heights by simply loosening set screws 18 and 23 and raising or lowering the yoke 17 and arms 22 as desired.

When it is desired to spread the brushes 62 set screws 47 and 48 are loosened, and the bolts 63 removed from yoke 34 whereupon the yoke 63 and the entire mechanism supported thereby (including hollow shaft 41, wheels 42 and rods 38) may be moved longitudinally upon the bar 9. This movement results in a corresponding telescopic movement between the hollow shafts 33 and extensions 46, and through arms 58 communicates outward movement to the forward ends of the brushes 62. Likewise the rear end of the brushes 62 may be adjusted laterally by removing set screws 51 and moving extensions 50 outwardly or inwardly with respect to sleeve 49. Any suitable mechanism may also be provided for raising and lowering the brushes 62. In the embodiment illustrated this mechanism comprises a pair of tubular sleeves 64 and 65 adjustably secured to bar 9 by lag screws 66, and extensions 67 and 68 secured in the ends of these sleeves by set screws 69. Levers 70 and 71 mounted respectively on the ends of extensions 67 and 68 have their free ends connected to the upper ends of link rods 72 and 73 attached at their lower ends to the rods 38 and 52. A connecting link 74 connects the two projections 75 and 76 on sleeves 64 and 65 respectively and an operating lever 77 on sleeve 64 affords means for simultaneously rocking the levers 70 and 71 to raise or lower the brushes 62.

From the foregoing it will be seen that both the forward and rear sets of brushes can be readily adjusted in either a vertical or lateral direction without disconnecting the driving mechanism.

Having thus described my invention what I claim is:

1. In a machine of the class described a support, a pair of brushes suspended from said support, a second pair of brushes suspended from said support and means for raising and lowering said last named pair of brushes.

2. In a machine of the class described a support, a set of brushes suspended from said support, said brushes being inclined forwardly from the vertical plane, means for raising and lowering said brushes, a second set of brushes suspended from said support, means for raising and lowering said second set of brushes, and means for independently rotating both sets of brushes.

3. In a machine of the class described, a support, a plurality of pairs of horizontally arranged brushes carried by said support, said brushes being arranged in pairs inclined rearwardly in a converging direction, means for altering the angle of inclination of said brushes, means for raising and lowering one pair of said brushes independently of the other pair.

4. In a machine of the class described, a support, a plurality of horizontally arranged brushes carried by said support, said brushes being arranged in pairs, inclined rearwardly in a converging direction, means for altering the angle of inclination of said brushes, means for raising and lowering one pair of said brushes independently of the other pair, and means for simultaneously raising or lowering all of said brushes.

In testimony whereof I affix my signature in presence of two witnesses.

EARL ROBERT SCOTT.

Witnesses:
GRACE C. IRVINE,
B. L. COX.